Patented June 26, 1945

2,379,082

UNITED STATES PATENT OFFICE 2,379,082

ROAD MAKING

Robert Llanfear James, Slough, England, assignor to International Bitumen Emulsions Limited, Slough, England, a company of Great Britain No Drawing. Application June 4, 1943, Serial No. 489,706. In Great Britain June 12, 1942

8 Claims. (Cl. 94—23)

This invention relates to improvements in or connected with the making of roads, paths, playgrounds, aerodrome runways and the like by stabilization of the base with asphaltic emulsion.

It is common to treat soil with slow breaking asphaltic emulsion in order to construct roads, paths, areodrome runways and the like. It is also common to treat soil with cement alone by the process known as cement stabilization in order to construct roads while it is known to mix an aggregate of stone and sand on the site with a combination of cement and asphaltic emulsion for road making. This last mentioned method does not employ the setting strength and plasticity afforded by the clay present in the soil.

The principal object of the present invention is to avoid or reduce the softening of the material in wet weather in humid climates which occurs in roads and the like formed by soil stabilization methods and at the same time to provide a high degree of plastic yield under load unobtainable by the use of cement stabilization alone.

It has been found as the result of experimental research that the softening of asphalt stabilized soil under the action of traffic in wet weather is caused by the circumstance that the initial drying of the soil has not been complete.

In accordance with the present invention this disadvantage is avoided by the addition to the soil as a supplement to a slow breaking asphaltic or tar emulsion of a small amount of cement or lime (calcium oxide or hydrate) or of a mixture of cement and lime ranging from 5 to 10 percent by weight, in the form of dry powder, whereby moisture is absorbed from the soil and the soil rendered more nearly waterproof, while the resulting material has a high plastic yield under load, so permitting the base slab of the material to conform to inequalities in the underlying ground.

If the cement or lime or the mixture of cement and lime is incorporated with the soil before the addition of the asphaltic or tar emulsion the final product is found to be more brittle and to have a higher final moisture content so making a less satisfactory road-making material and the cement or lime or mixture is therefore preferably added subsequently. In constructing a road or the like adding the cement or lime first the cement or lime and dry soil are intimately mixed by harrows, discs or by a road mixer of the Woods or Barber Green type. Water is then added to bring the material to a fluid or semi-fluid condition and stable asphaltic or stable tar emulsion is sprayed into the soil and mixed in by the same mechanical means. After a suitable drying interval rolling is carried out, if desired after breaking up the initially set material.

Preferably the asphaltic or the tar emulsion is mixed with the soil, the whole mixed in a fluid or semiplastic state, permitted to dry for a suitable drying interval and then cement or lime or mixture added in powder form and intimately mixed with the soil before rolling.

In one example of the preferred practice the soil is broken up by ploughing and discing; sand is added to reduce the lower liquid limit to 22% and the loss on ignition to 3%. The percentage passing 200 mesh should then lie between 25 and 35% by oven dry weight. 5% stable asphalt emulsion such as that known under the trade name Bitumuls H. R. M. and water is then mixed in at the lower liquid limit by means of a Woods road mixer or spring tooth harrows. The ground is then allowed to dry out for 1 to 3 days so that the soil will be just workable after cement is added. About 7.5% Portland cement is then added and the dry cement mixed in with the slightly moist soil using harrows, rubber tyred rollers and rotary cultivators. The ground is rolled as soon as mixing is complete. Final rolling may be carried out with an indented roller.

When required to resist heavy traffic or abrasion the surface of the soil stabilized by this method may be treated with concrete, asphaltic concrete, tar macadam, or asphalt, or may be sprayed with an asphaltic or tarry liquid and dressed with stone chippings or sand.

I claim:

1. In the making of roads and the like by the stabilization of the base soil with a slow-breaking emulsion of a heavy hydrocarbon, mixing the emulsion with the soil in a fluid or semi-plastic state, permitting the resulting mixture to dry to such an extent that it will be just workable after addition of a hydraulic setting medium, intimately mixing from 5% to 10% of a hydraulic setting medium in powder form with the partially dried soil and emulsion mixture, and subsequently rolling.

2. In the making of roads and the like by the stabilization of the base soil with asphaltic emulsion, mixing the asphaltic emulsion with the soil in a fluid or semi-plastic state, permitting the resulting mixture to dry to such an extent that it will be just workable after addition of cement intimately mixing from 5 to 10% of cement in powder form with the partially dried soil and emulsion mixture, and subsequently rolling.

3. In the making of roads and the like by the stabilization of the base soil with asphaltic emulsion, mixing the asphaltic emulsion with the soil in a fluid or semi-plastic state, permitting the resulting mixture to dry to such an extent that it will be just workable after addition of lime intimately mixing from 5 to 10% of lime in powder form with the partially dried soil and emulsion mixture, and subsequently rolling.

4. In the making of roads and the like by stabilization of the base with asphaltic emulsion, breaking up the soil, adding sand to reduce the lower liquid limit to about 22% and the loss on ignition to about 3%, mixing in with the soil 5% stable asphaltic emulsion and water, permitting the ground to dry until just workable, mixing in 5 to 10% dry cement with the slightly moist soil and rolling.

5. In the making of roads and the like by stabilization of the base with asphaltic emulsion, breaking up the soil, adding sand to reduce the lower liquid limit to about 22% and the loss on ignition to about 3%, mixing in with the soil 5% stable asphaltic emulsion and water, permitting the ground to dry until just workable, mixing in 5 to 10% dry lime with the slightly moist soil and rolling.

6. In the making of roads and the like by stabilization of the base with asphaltic emulsion, breaking up the soil, adding sand to reduce the lower liquid limit to about 22% and the loss on ignition to about 3%, mixing in with the soil 5% stable asphaltic emulsion and water, permitting the ground to dry until just workable, mixing in 5 to 10% dry cement with the slightly moist soil and rolling and treating the surface of the soil thus stabilized to resist heavy traffic in any of the ways usual in road making.

7. In the making of roads and the like by stabilization of the base with tar emulsion, breaking up the soil, adding sand to reduce the lower liquid limit to about 22% and the loss on ignition to about 3%, mixing in with the soil 5% stable tar emulsion and water, permitting the ground to dry until just workable, mixing in 5 to 10% dry cement with the slightly moist soil and rolling and treating the surface of the soil thus stabilized to resist heavy traffic in any of the ways usual in road making.

8. In the making of roads and the like by stabilization of the base with asphaltic emulsion, breaking up the soil, adding sand to reduce the lower liquid limit to about 22% and the loss on ignition to about 3%, mixing in with the soil 5% stable asphaltic emulsion and water, permitting the ground to dry until just workable, mixing in 5 to 10% dry lime with the slightly moist soil and rolling and treating the surface of the soil thus stabilized to resist heavy traffic in any of the ways usual in road making.

ROBERT LLANFEAR JAMES.